(12) United States Patent
Cymbal et al.

(10) Patent No.: US 7,556,293 B2
(45) Date of Patent: Jul. 7, 2009

(54) TELESCOPING STEERING COLUMN ASSEMBLY AND METHOD OF MANUFACTURING THE ASSEMBLY

(75) Inventors: William David Cymbal, Freeland, MI (US); Marvin V. Manwaring, Clio, MI (US); Ravi Ravindra, Saginaw, MI (US); David E Witucki, Bay City, MI (US)

(73) Assignee: Delphi Technologies, Inc., Troy, MI (US)

( * ) Notice: Subject to any disclaimer, the term of this patent is extended or adjusted under 35 U.S.C. 154(b) by 354 days.

(21) Appl. No.: 11/395,346

(22) Filed: Mar. 31, 2006

(65) Prior Publication Data

US 2006/0290127 A1    Dec. 28, 2006

Related U.S. Application Data

(60) Provisional application No. 60/694,402, filed on Jun. 27, 2005.

(51) Int. Cl.
  *B62D 1/18* (2006.01)
  *B21D 53/88* (2006.01)
(52) U.S. Cl. .................. 280/775; 29/897.2; 29/458; 29/527.1
(58) Field of Classification Search ............ 29/447, 29/458, 469.5, 522.1, 525.01, 527.1, 527.2, 29/897.2; 74/493; 280/775, 777
See application file for complete search history.

(56) References Cited

U.S. PATENT DOCUMENTS

| | | | |
|---|---|---|---|
| 3,373,629 A |   | 3/1968 | Wight et al. |
| 3,491,614 A | * | 1/1970 | Demske et al. ............... 74/493 |
| 3,703,105 A | * | 11/1972 | Milton et al. ............... 74/492 |
| 4,627,306 A | * | 12/1986 | Berenjian ................. 74/492 |
| 4,648,624 A | * | 3/1987 | Mouhot et al. ............ 280/775 |
| 4,667,530 A |   | 5/1987 | Mettler et al. |
| 4,774,851 A |   | 10/1988 | Iwanami et al. |
| 4,972,732 A |   | 11/1990 | Venable et al. |
| 5,080,334 A |   | 1/1992 | Mihara et al. |

(Continued)

FOREIGN PATENT DOCUMENTS

DE    42 16 503    11/1992

(Continued)

OTHER PUBLICATIONS

European Search Report dated Aug. 17, 2006.

*Primary Examiner*—Faye M. Fleming
*Assistant Examiner*—Laura Freedman
(74) *Attorney, Agent, or Firm*—Thomas N. Twomey (57) ABSTRACT

A telescoping steering column assembly and method of manufacturing the assembly are disclosed. The assembly includes an outer jacket defining at least one hole and a central axis. An inner jacket is disposed in the outer jacket and slides relative to the outer jacket along the central axis. A plug having a body portion and a flange extending radially outwardly from the body portion is disposed in the hole of the outer jacket. The plug defines at least one channel and the plug is heated to create a molten material that flows into the channel of the plug for securing the plug within the hole to prevent movement of the plug along the central axis and for aligning the inner jacket within the outer jacket to allow the inner jacket to slide within the outer jacket.

10 Claims, 8 Drawing Sheets

U.S. PATENT DOCUMENTS

| | | | |
|---|---|---|---|
| 5,086,661 A | 2/1992 | Hancock | |
| 5,199,319 A * | 4/1993 | Fujiu | 74/493 |
| 5,228,720 A * | 7/1993 | Sato et al. | 280/777 |
| 5,243,874 A | 9/1993 | Wolfe et al. | |
| 5,348,345 A | 9/1994 | Dykema et al. | |
| 5,383,811 A | 1/1995 | Campbell et al. | |
| 5,460,574 A | 10/1995 | Hobaugh | |
| 5,507,203 A | 4/1996 | Audibert et al. | |
| 5,509,324 A * | 4/1996 | Cymbal | 74/492 |
| 5,560,650 A | 10/1996 | Woycik et al. | |
| 5,590,565 A | 1/1997 | Palfenier et al. | |
| 5,605,351 A * | 2/1997 | Higashino | 280/775 |
| 5,640,884 A | 6/1997 | Fujiu et al. | |
| 5,722,300 A | 3/1998 | Burkhard et al. | |
| 5,737,971 A * | 4/1998 | Riefe et al. | 74/493 |
| 6,026,704 A * | 2/2000 | Shibata et al. | 74/496 |
| 6,099,036 A * | 8/2000 | Fujiu et al. | 280/777 |
| 6,149,526 A | 11/2000 | Boersma et al. | |
| 6,223,619 B1 | 5/2001 | Shibata et al. | |
| 6,254,131 B1 | 7/2001 | Link | |
| 6,273,468 B1 | 8/2001 | Bohner et al. | |
| 6,343,993 B1 | 2/2002 | Duval et al. | |
| 6,389,923 B1 | 5/2002 | Barton et al. | |
| 6,623,036 B2 * | 9/2003 | Yamamura et al. | 280/775 |
| 6,729,648 B2 | 5/2004 | Ulintz | |
| 6,733,039 B2 | 5/2004 | Honda et al. | |
| 6,754,944 B2 | 6/2004 | Barton et al. | |
| 6,892,602 B2 | 5/2005 | Hirschfeld et al. | |
| 6,948,401 B2 * | 9/2005 | Zernickel et al. | 74/493 |
| 7,261,014 B2 * | 8/2007 | Arihara | 74/493 |
| 2005/0200111 A1 | 9/2005 | Cymbal et al. | |
| 2005/0262960 A1 | 12/2005 | Cymbal et al. | |
| 2006/0117898 A1 * | 6/2006 | Schneider et al. | 74/492 |
| 2007/0137378 A1 * | 6/2007 | Bastein et al. | 74/493 |

FOREIGN PATENT DOCUMENTS

| | | |
|---|---|---|
| DE | 103 43 685 | 4/2005 |
| FR | 2 561 605 | 9/1985 |
| GB | 2 343 154 | 5/2000 |
| JP | 02179580 A * | 7/1990 |
| JP | 05262239 A * | 10/1993 |

* cited by examiner

TELESCOPING STEERING COLUMN ASSEMBLY AND METHOD OF MANUFACTURING THE ASSEMBLY

CROSS REFERENCE TO RELATED APPLICATION

This application claims the benefit of U.S. provisional patent application Ser. No. 60/694,402, which was filed on Jun. 27, 2005.

BACKGROUND OF THE INVENTION

1. Field of the Invention

The present invention relates a telescoping steering column assembly and method of manufacturing the assembly.

2. Description of the Prior Art

Various assemblies and methods of manufacture relating to telescoping steering columns for a vehicle are known in the art. Such an assembly and method of manufacture are disclosed in U.S. Pat. No. 5,722,300 (the '300 patent) to Burkhard, et al. The '300 patent discloses an outer jacket defining at least one hole and a central axis, in which an inner jacket is disposed and slides relative to the outer jacket along the central axis. A bushing is disposed between the inner and outer jackets and defines a chamber. A molten material is injected into the hole of the outer jacket and fills the chamber between the inner and outer jackets to define a plug. However, there are inconsistencies in the molten material when the molten material fills the chamber, such as spaces formed in the molten material, which decreases the quality of the plug and fails to fill the tolerances between the inner jacket and the outer jacket.

Therefore, there remains a need to develop a telescoping steering column assembly and method of manufacturing for a vehicle having a plug to completely fill the spaces between the inner and outer jackets and increase the quality of the plug.

SUMMARY OF THE INVENTION AND ADVANTAGES

The present invention provides for a method of manufacturing a telescoping steering column assembly for a vehicle having an inner jacket slidable within an outer jacket with the outer jacket defining at least one hole. The telescoping steering column assembly includes a plug having a body portion and a flange extending radially outwardly from the body portion with the plug defining at least one channel. The method comprises the steps of inserting the plug into the hole of the outer jacket. The inner jacket is disposed within the outer jacket along a central axis. The plug is heated to create a molten material and the molten material flows into the channel of the plug for securing the plug within the hole of the outer jacket to prevent movement of the plug along the central axis and for aligning the inner jacket within the outer jacket to allow the inner jacket to slide within the outer jacket.

The present invention further provides a telescoping steering column assembly for a vehicle having an outer jacket defining a hole and a central axis. An inner jacket is slidable relative to the outer jacket along the central axis. A plug having a body portion and a flange extending radially outwardly from the body portion is disposed in the hole of the outer jacket. More specifically, the body portion of the plug is disposed in the hole of the outer jacket with the flange abutting the inner jacket. The plug defines at least one channel for receiving a molten material upon application of heat to the plug for securing the plug within the hole to prevent movement of the plug along the central axis and for aligning the inner jacket within the outer jacket to allow the inner jacket to slide within the outer jacket.

The present invention therefore provides a telescoping steering column assembly and method of manufacturing the assembly having an outer jacket defining at least one hole in which a plug is disposed in the hole to eliminate spaces between the inner jacket and the outer jacket. In addition, the plug fits varying sized holes because the molten material fills any tolerance spaces accordingly. Additionally, the quality of the plug is increased because only a portion of the plug is melted to create the molten material.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 13A is an enlarged view of the plug within the inner jacket and the outer jacket after melting the plug.

DETAILED DESCRIPTION OF THE INVENTION

Referring to the Figures, wherein like numerals indicate corresponding parts throughout the several views, a telescoping steering column assembly for a vehicle is generally shown at 20.

Figure 1:
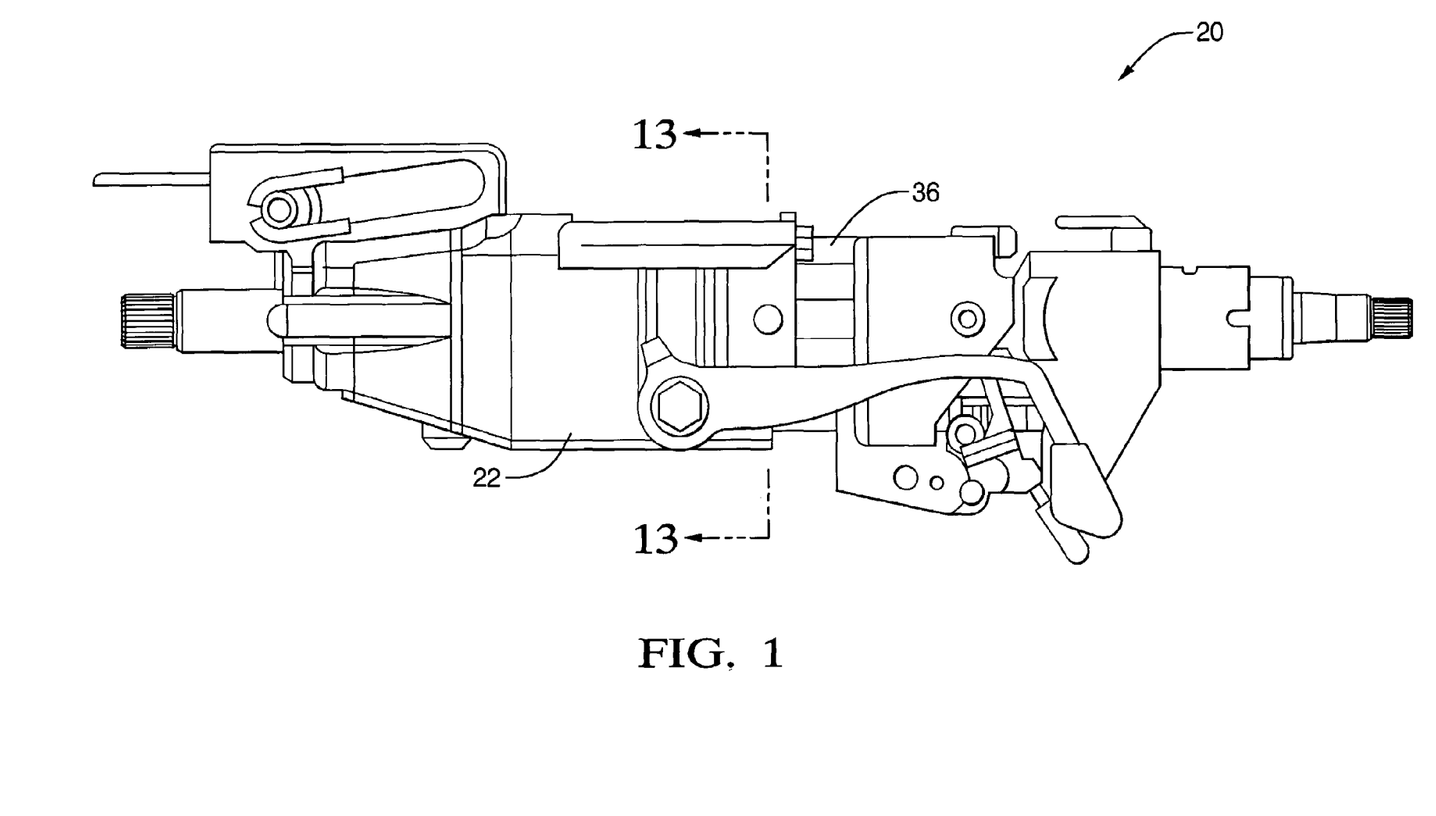
FIG. 1 is a side view of a telescoping steering column assembly.
Figure 2:
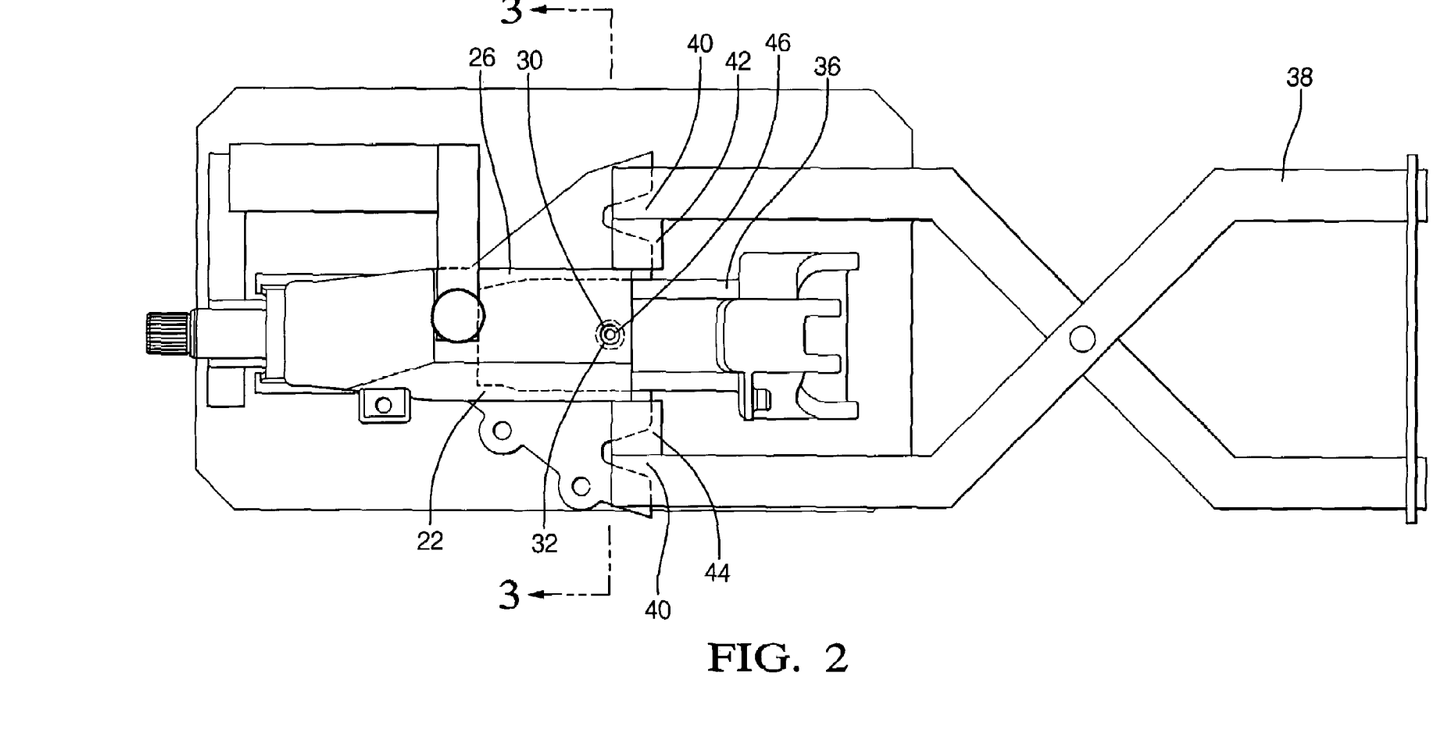
FIG. 2 is a top view of the telescoping steering column assembly disposed upside down in a clamp.
Figure 3:
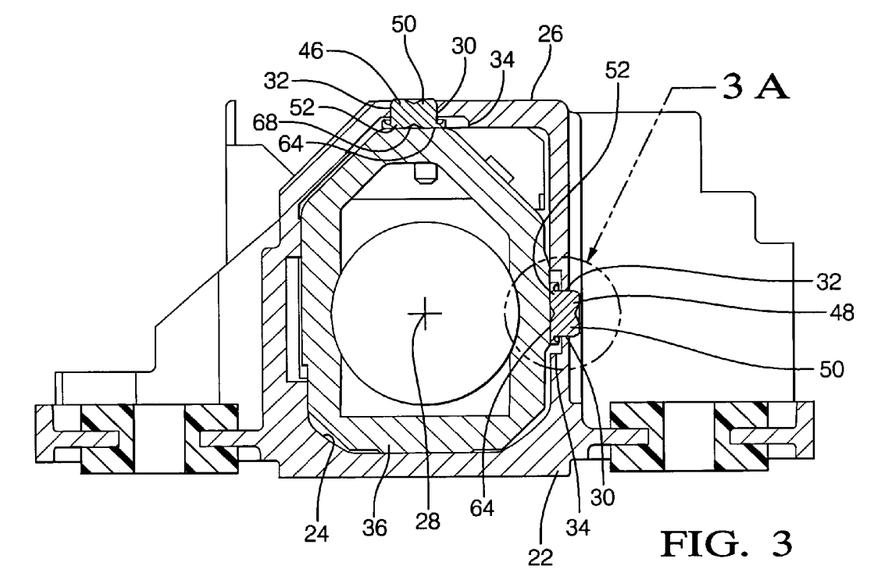
FIG. 3 is a cross-sectional view an inner jacket disposed within an outer jacket and having a plug disposed therein taken along line 3-3 of FIG. 2.
Figure 3A:
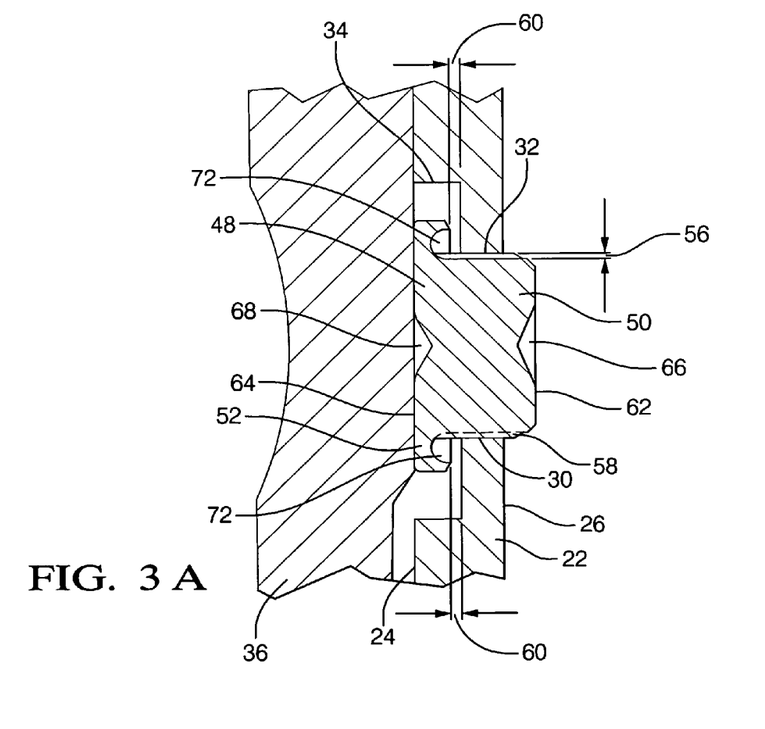
FIG. 3A is an enlarged view of the plug within the inner jacket and the outer jacket before melting the plug.
Figure 12:
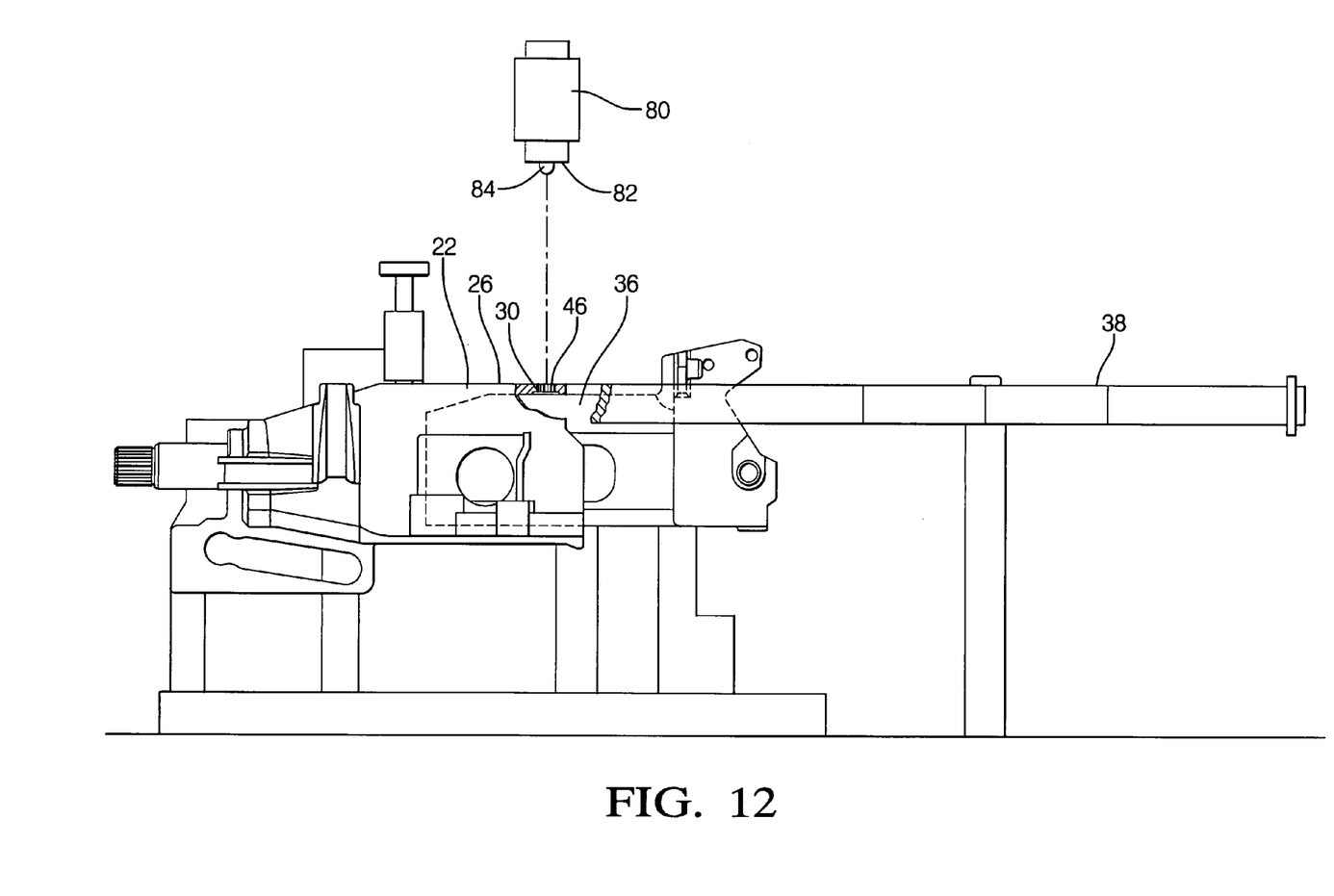
FIG. 12 is a side view of the telescoping steering column assembly disposed upside down in the clamp and having a thermal energy device aligned with the plug.

Referring to FIGS. 2 and 3, the telescoping steering column assembly 20 includes an outer jacket 22 having an inner surface 24 and an outer surface 26 opposing one another. The outer jacket 22 defines a central axis 28 and at least one hole having an outer diameter 32. Preferably, the at least one hole of the outer jacket 22 is further defined as a plurality of holes 30 disposed between the inner surface 24 and the outer surface 26 of the outer jacket 22. The inner surface 24 of the outer jacket 22 further defines at least one recess adjacent one of the holes 30. More particularly, the at least one recess is further defined as a plurality of recesses 34 disposed adjacent to each of the holes 30 in the outer jacket 22. As illustrated in FIGS. 2, 3 and 12, the telescoping steering column assembly 20 is upside down and some of the components of the assembly have been removed to gain access to the holes 30 in the outer jacket 22.

An inner jacket 36 is disposed in the outer jacket 22 and slides relative to the outer jacket 22 along the central axis 28. More specifically, the inner jacket 36 is disposed on the inner surface 24 of the outer jacket 22. The inner jacket 36 and the outer jacket 22 are preferably formed of magnesium, aluminum, or steel to assist in dissipating heat. However, it is to be appreciated that the inner jacket 36 and the outer jacket 22 may be formed of any acceptable material known in the art.

As best shown in FIG. 2, a clamp 38 is utilized to apply force to the outer surface 26 of the outer jacket 22 to move a portion of the inner surface 24 of the outer jacket 22 away from the inner jacket 36. The clamp 38 has a pair of ends 40 spaced from each other. A sensor 42 is disposed on one end 40 of the clamp 38 for adjusting and monitoring the force applied to the outer jacket 22. A spacer 44 is disposed on the other end 40 of the clamp 38 and has a thickness approximately equal to the senor to evenly apply force on the outer jacket 22. It is contemplated that any clamping device may be used to apply force to the outer jacket 22. When the clamp 38 is released, the inner surface 24 of the outer jacket 22 wants to spring back toward the inner jacket 36. The plug 45 prevents the outer jacket 22 from returning to an original position toward the inner jacket 36. This creates a normal force through the plug 45 and into the inner jacket 36. The normal force coupled with a coefficient of friction of the plug 45 and the inner jacket 36 creates a frictional force to define an amount of effort needed to move the inner jacket 36 within the outer jacket 22 to prevent the inner jacket 36 from falling out of the outer jacket 22.

Referring to FIGS. 3-6, a plug, generally shown at 45, is disposed within one of the holes 30 of the outer jacket 22. Preferably, the plug 45 is defined as a first plug 46 and further including a second plug 48. The second plug 48 is disposed in the other hole 30 of the outer jacket 22 and spaced from the first plug 46. It is to be appreciated that the second plug 48 has the same characteristics as the first plug 46. Preferably, the plug 45 is formed of a polymeric material. Even more preferably, the polymeric material is further defined as nylon. Most preferably, the polymeric material is formed of nylon 6. However, it is to be appreciated that the plug 45 may be formed of polytetrafluoro-ethylene, silicone, or any other acceptable material known in the art.

The plug 45 has a body portion 50 and a flange 52 extending radially outwardly from the body portion 50. More particularly, the body portion 50 is disposed in one of the holes 30 of the outer jacket 22 and the flange 52 is disposed in one of the recesses 34 of the outer jacket 22 and abuts the inner jacket 36. The body portion 50 of the plug 45 defines a body diameter 54 smaller than the outer diameter 32 of the holes 30 to define a gap 56 when the plug 45 is disposed in one of the holes 30 of the outer jacket 22. A plurality of ribs 58 projects radially outwardly from the body diameter 54 of the body portion 50 and spaced from each other for securing the plug 45 within one of the holes 30 of the outer jacket 22 and defining a size of the gap 56. The flange 52 of the plug 45 is spaced from the inner surface 24 of the outer jacket 22 to define a void 60 when the plug 45 is disposed in the gap 56.

The body portion 50 has a top surface 62 and the flange 52 has a bottom surface 64 disposed opposite the top surface 62. The top surface 62 of the body portion 50 defines a dimple 66 for receiving an application of heat and the bottom surface 64 defines a hollow 68. A lubricant (not shown) is disposed in the hollow 68 of the bottom surface 64 to provide lubrication between the inner jacket 36 and the outer jacket 22 as the flange 52 wears away due to the inner jacket 36 sliding along the central axis 28 on the bottom surface 64 of the plug 45 (as shown in FIG. 3).

Figure 4:
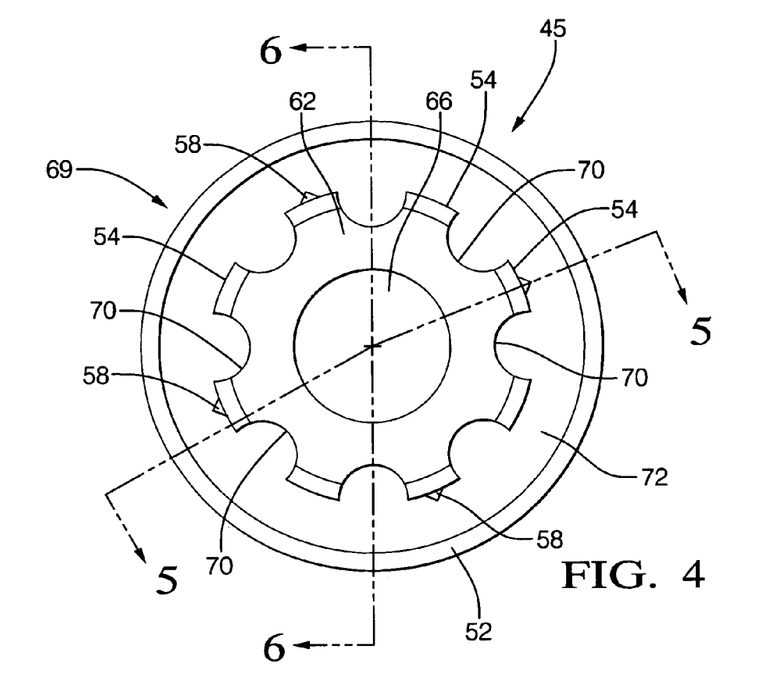
FIG. 4 is a top view of the plug.
Figure 5:
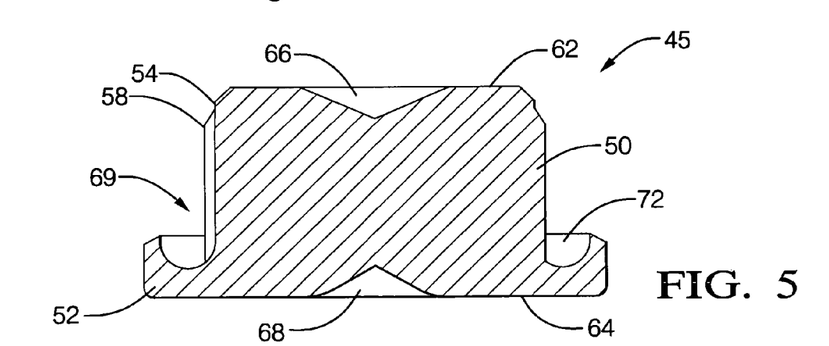
FIG. 5 is a cross-sectional side view of the plug taken along line 5-5 of FIG. 4.
Figure 6:
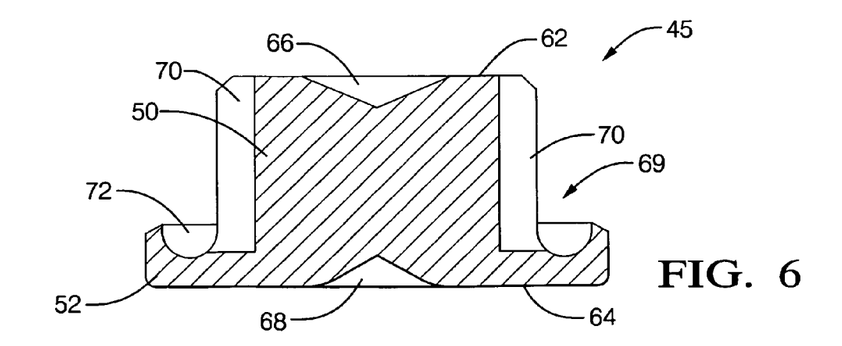
FIG. 6 is a cross-sectional side view of the plug taken along line 6-6 in FIG. 4.

The plug 45 further defines at least one channel, generally shown at 69. Preferably, the channel 69 of the plug 45 is further defined as at least one channel defined in the body portion 50. Even more preferably, the channel of the body portion 50 is further defined as a plurality of channels 70 spaced from each other and spaced from the ribs 58. The channels 70 of the body portion 50 extend from the top surface 62 of the body portion 50 to the flange 52. In addition, the channel 69 of the plug 45 is further defined as a channel 72 disposed continuously in the flange 52 adjacent the channels 70 of the body portion 50.

Figure 7:
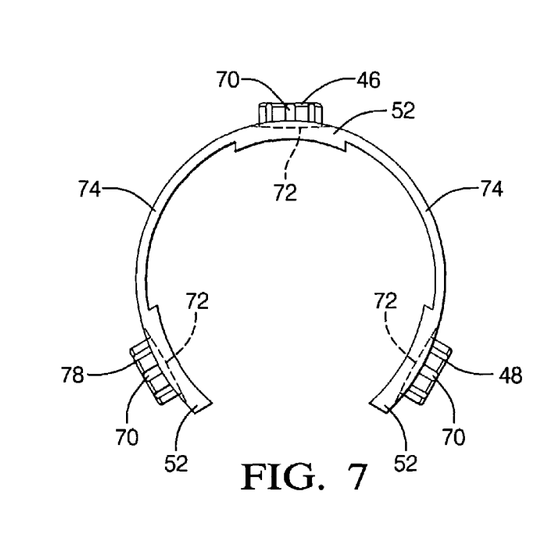
FIG. 7 is a side view of an alternative configuration of the plug having a support interconnecting a plurality of plugs.
Figure 8:
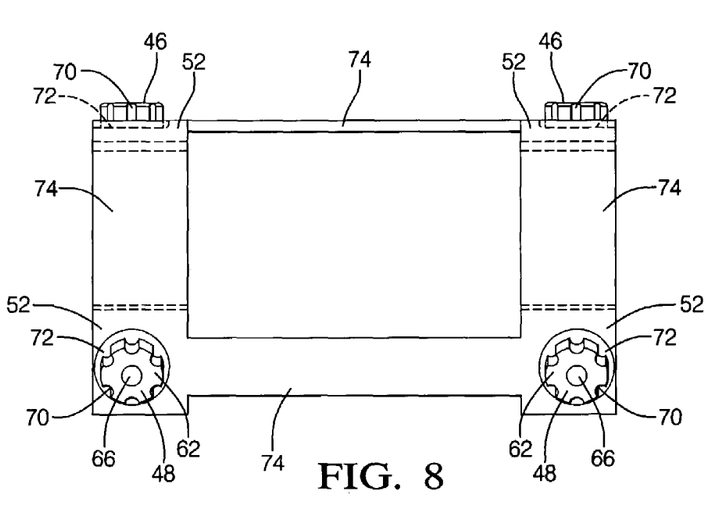
FIG. 8 is a front view of the alternative configuration of the plugs interconnected by the support.
Figure 9:
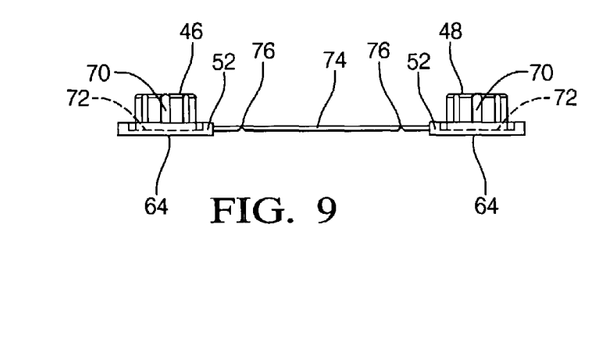
FIG. 9 is a side view of the alternative configuration of the plug in which the support has at least one bending portion.
Figure 10:
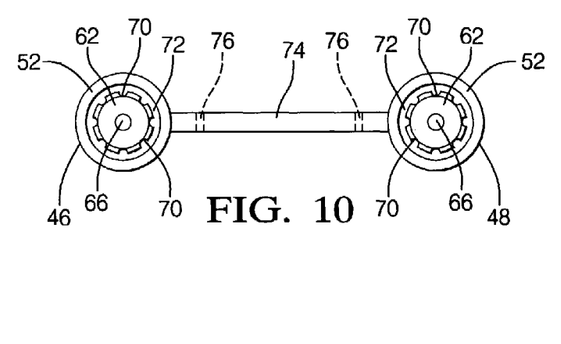
FIG. 10 is a top view of the alternative configuration of the plug in which the support has the bending portion.
Figure 11:
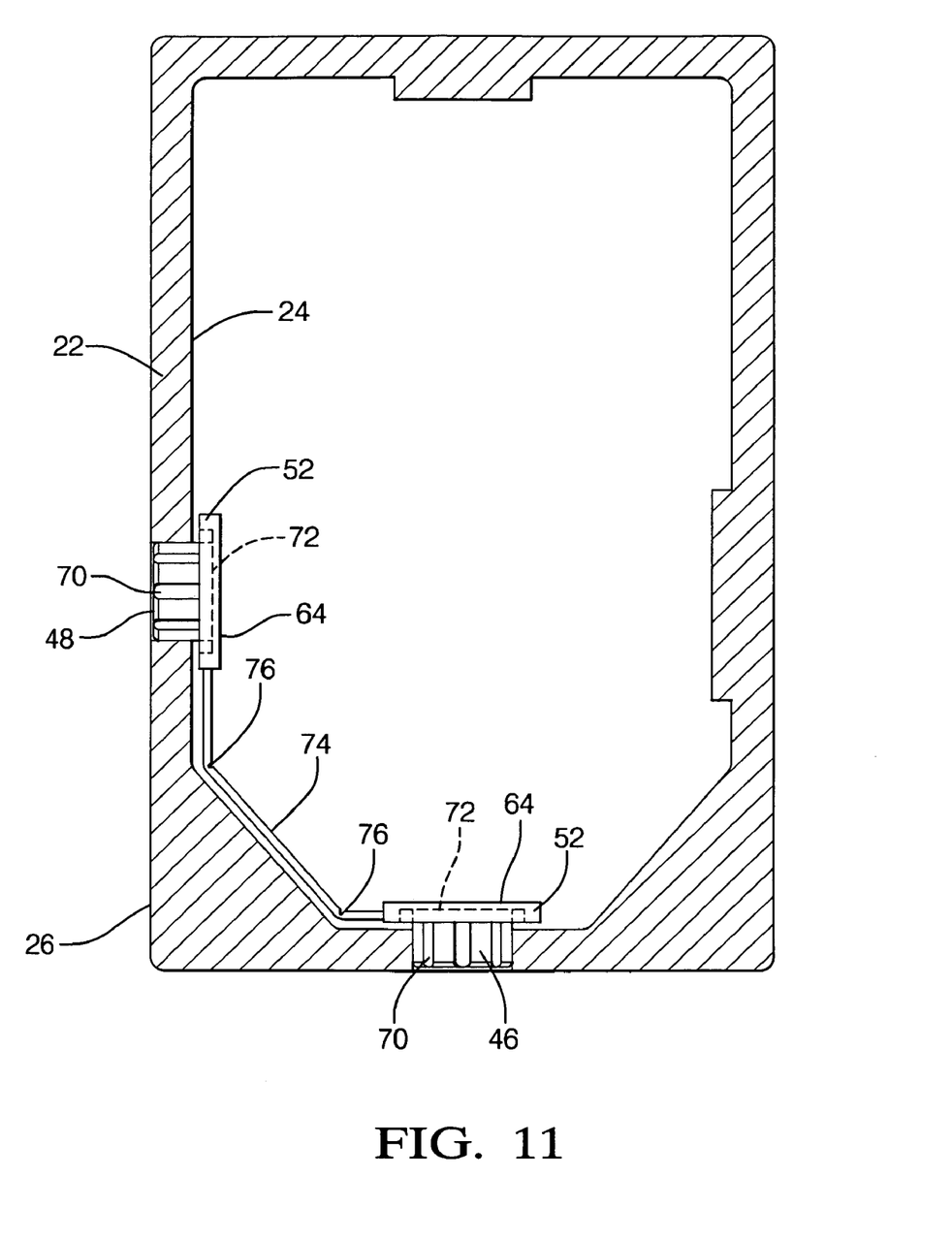
FIG. 11 is a cross-sectional view of the outer jacket and a side view of the alternative configuration of the plug disposed within a plurality of holes defined in the outer jacket to illustrate the bending portion of the support accommodating the configuration of the outer jacket.

Alternatively, the telescoping steering column assembly 20 may include a support 74 disposed between the first plug 46 and the second plug 48 as shown in FIGS. 7-11. The support 74 may have at least one bending portion 76 to accommodate the configuration of the inner surface 24 of the outer jacket 22 (as shown in FIG. 11). Referring to FIGS. 7 and 8, the plug 45 may further be defined as a plurality of plugs 46, 48, 78 spaced from each other and interconnected to the support 74. The support 74 interconnects the plugs 46, 48, 78 for providing a quick and easy way to install multiple plugs at one time. It is to be appreciated that in FIG. 7, there are corresponding plugs 46, 48, 78 spaced behind the plugs 46, 48, 78 shown.

Referring to FIG. 12, a thermal energy device 80 having a stop surface 82 and a tip 84 extending therefrom is utilized to melt the top surface 62 of the plug 45 while the plug 45 is in one of the holes 30 of the outer jacket 22. The thermal energy device 80 applies a force to the top surface 62 of the plug 45 to aid in melting the plug 45. More specifically, the tip 84 of the thermal energy device 80 applies force and transfers heat to the top surface 62 of the plug 45. It is contemplated that any heating device may be used to melt the plug 45.

Figure 13:
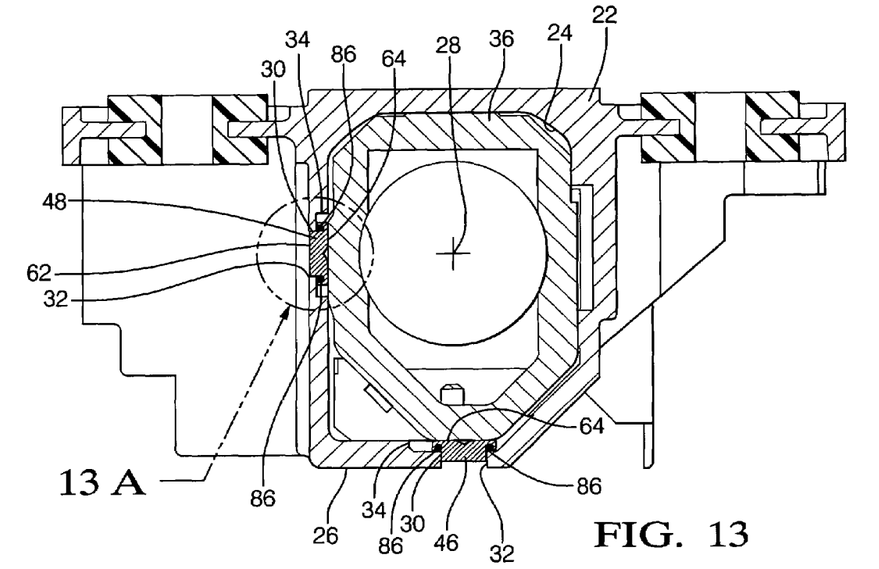
FIG. 13 is a cross-sectional view of the inner jacket disposed within the outer jacket and having the plug disposed therein taken along line 13-13 of FIG. 1.

Also referring to FIGS. 13 and 13A, a molten material 86 is created upon application of heat to the plug 45. More specifically, the tip 84 of the thermal energy device 80 transfers heat to the top surface 62 of the plug 45 to create the molten material 86. However, it is to be appreciated that only a portion of the plug 45 is melted which increases the quality of the plug 45.

The channels 70 of the body portion 50 guide the molten material 86 toward the flange 52 and at least partially fills the gap 56 between the body diameter 54 and the outer diameter 32 with the molten material 86 to secure the plug 45 within one of the holes 30 of the outer jacket 22. Preferably, the gap 56 is completely filled with the molten material 86. The channel 72 of the flange 52 receives the molten material 86 from the channels 70 of the body portion 50. The molten material 86 completely fills the channel 72 of the flange 52 and the void 60 between the inner surface 24 of the outer jacket 22 and the flange 52. The molten material 86 fills the gap 56 and the void 60 to allow the plug 45 to accommodate varying tolerances between the holes 30 of the outer jacket 22 and the inner surface 24 of the outer jacket 22 because the molten material 86 fills the gap 56 and the void 60 to create a tight fit.

The top surface 62 is heated until the top surface 62 is spaced a predetermined distance 88 from the outer surface 26 of the outer jacket 22. More specifically, as the top surface 62 melts, the tip 84 of the thermal energy device 80 moves toward one of the holes 30 of the outer jacket 22 and stops moving when the stop surface 82 abuts the outer surface 26 of the outer jacket 22. When the stop surface 82 abuts the outer surface 26 of the outer jacket 22, the thermal energy device 80 stops creating the molten material 86. The molten material 86 quickly cools because the inner jacket 36 and the outer jacket 22 are formed of material that quickly dissipates heat from the plug 45. The molten material 86 becomes integral with the plug 45 for securing the plug 45 within one of the holes 30 of the outer jacket 22 to prevent movement of the plug 45 along the central axis 28 and for aligning the inner jacket 36 within the outer jacket 22 to allow the inner jacket 36 to slide within the outer jacket 22. It is contemplated that a second thermal energy device (not shown) may be used to heat the second plug 48 simultaneously with the first plug 46.

The subject invention also provides a method of manufacturing the telescoping steering column assembly 20 for the vehicle, in which the assembly 20 includes the inner jacket 36 slidable within the outer jacket 22 with the outer jacket 22 defining the at least one hole. The telescoping steering column assembly 20 further includes the plug 45 having the body portion 50 and the flange 52 extending radially outwardly from the body portion 50 with the plug 45 defining the at least one channel 69. The method includes inserting the plug 45 into the hole of the outer jacket 22 having the inner surface 24 and the outer surface 26 opposing one another. More particularly, the body portion 50 of the plug 45 is inserted into the hole and the flange 52 is spaced from the inner surface 24 to define the void 60 between the flange 52 and the inner surface 24. The body portion 50 defines the body diameter 54 and the hole defines the outer diameter 32 larger than the body diameter 54 such that the plug 45 is inserted into the hole of the outer jacket 22 to define the gap 56 between the body diameter 54 of the body portion 50 and the outer diameter 32 of the hole.

After inserting the plug 45 into the hole of the outer jacket 22, the inner jacket 36 is disposed within the outer jacket 22 along the central axis 28. Force is applied to the outer surface 26 of the outer jacket 22 to move the portion of the inner surface 24 away from the inner jacket 36. The method further includes heating the plug 45 to create the molten material 86. Force and heat are applied to the top surface 62 of the body portion 50 to guide the molten material 86 into the channel of the body portion 50. The force and heat are applied until the top surface 62 is spaced the predetermined distance 88 from the outer surface 26 of the outer jacket 22. The molten material 86 flows into the channel 69 of the plug 45 for securing the plug 45 within the hole of the outer jacket 22 to prevent movement of the plug 45 along the central axis 28 and for aligning the inner jacket 36 within the outer jacket 22 to allow the inner jacket 36 to slide within the outer jacket 22.

The channel 69 of the plug 45 is further defined in the body portion 50. The channel of the body portion 50 extends from the top surface 62 of the body portion 50 to the flange 52 and the molten material 86 flows into the channel of the body portion 50 to at least partially fill the gap 56 between the body diameter 54 of the body portion 50 and the outer diameter 32 of the hole with the molten material 86. In addition, the channel 69 of the plug 45 is further defined in the flange 52. The molten material 86 flows onto the flange 52 to fill the void 60 between the inner surface 24 of the outer jacket 22 and the flange 52. More specifically, the molten material 86 flows into the channel of the body portion 50 and into the channel 72 of the flange 52 to fill the void 60 between the flange 52 and the inner surface 24 of the outer jacket 22.

Obviously, many modifications and variations of the present invention are possible in light of the above teachings. The foregoing invention has been described in accordance with the relevant legal standards; thus, the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. A method of manufacturing a telescoping steering column assembly for a vehicle having an inner jacket slidable within an outer jacket with the outer jacket defining at least one hole and a plug having a body portion and a flange extending radially outwardly from the body portion with the plug defining at least one channel, said method comprising the steps of;
   inserting the plug into the hole of the outer jacket,
   disposing the inner jacket within the outer jacket along a central axis,
   heating the plug to create a molten material, and
   flowing the molten material into the channel of the plug for securing the plug within the hole of the outer jacket to prevent movement of the plug along the central axis and for aligning the inner jacket within the outer jacket to allow the inner jacket to slide within the outer jacket.

2. A method as set forth in claim 1 wherein the body portion includes a body diameter and the hole includes an outer diameter larger than the body diameter and wherein the step of inserting the plug into the hole is further defined as inserting the body portion into the hole to define a gap between the body diameter of the body portion and the outer diameter of the hole.

3. A method as set forth in claim 2 wherein the step of flowing the molten material is further defined as flowing the molten material into the gap between the body diameter of the body portion and the outer diameter of the hole.

4. A method as set forth in claim 3 wherein the channel of the plug is defined in the body portion with the body portion having a top surface and the channel extending from the top surface to the flange and wherein the step of flowing the molten material is further defined as flowing the molten material into the channel of the body portion to at least partially fill the gap between the hole and the body portion with the molten material.

5. A method as set forth in claim 4 further including applying force to the top surface of the plug to guide the molten material into the channel of the body portion.

6. A method as set forth in claim 1 wherein the channel of the plug is defined in the flange and wherein the step of flowing the molten material is further defined as flowing the molten material into the channel of the flange.

7. A method as set forth in claim 1 wherein the outer jacket has an inner surface and an outer surface opposing one another and further including the step of applying force to the outer surface to move a portion of the inner surface away from the inner jacket.

8. A method as set forth in claim 7 wherein the step of heating the plug is further defined as heating a top surface of the body portion until the top surface is spaced a predetermined distance from the outer surface of the outer jacket.

9. A method as set forth in claim 7 wherein the step of inserting the plug is further defined as inserting the body portion into the hole with the flange spaced from the inner surface of the outer jacket to define a void between the flange and the inner surface.

10. A method as set forth in claim 9 wherein the step of flowing the molten material is further defined as flowing the molten material onto the flange to fill the void between the inner surface of the outer jacket and the flange.

* * * * *